United States Patent [19]

Tanaka et al.

[11] Patent Number: 4,814,376

[45] Date of Patent: Mar. 21, 1989

[54] PROCESS FOR PREPARING ORGANOPOLYSILOXANE EMULSION

[75] Inventors: Masaki Tanaka, Annaka; Fumio Okada, Takasaki; Toshio Oba; Hiroshi Oohashi, both of Annaka; Tatuo Tanaka, Gunma, all of Japan

[73] Assignee: Shin-Etsu Chemical Co., Ltd., Tokyo, Japan

[21] Appl. No.: 119,568

[22] Filed: Nov. 12, 1987

[30] Foreign Application Priority Data

Nov. 13, 1986 [JP] Japan .................................. 61-270423

[51] Int. Cl.$^4$ .............................................. C08L 75/00
[52] U.S. Cl. ................................ 524/588; 106/287.13; 106/287.14; 524/837; 524/860; 252/314
[58] Field of Search ....................... 524/588, 837, 860; 106/287.13, 287.14; 252/314

[56] References Cited

U.S. PATENT DOCUMENTS 4,509,981 4/1985 Sanders, Jr. et al. .......... 106/287.13
4,518,727 5/1985 Traver ............................. 106/287.13

Primary Examiner—Melvin I. Marquis
Attorney, Agent, or Firm—Foley & Lardner, Schwartz, Jeffery, Schwaab, Mack, Blumenthal & Evans

[57] ABSTRACT

A process for preparing organopolysiloxane emulsion comprised of dispersed particles having an average particle size of 0.5μ or less, comprising emulsifying a liquid organopolysiloxane with use of an emulsifying agent by means of a composite emulsifying apparatus equipped with (A) a stirring means having a stirring blade capable of stirring contents of a container at a low speed over the whole of the container, and at least one stirring means selected from (B) a disc type stirring means capable of rotating at a high speed and having tooth-like projections on its peripheral edge, and (C) a stirring means having a stator and a turbine blade disposed in the inside of the stator and capable of rotating at a high speed. According to this process, an organopolysiloxane having a high viscosity up to 500,000 cP can be emulsified to prepare an emulsion of high stability.

14 Claims, 1 Drawing Sheet

PROCESS FOR PREPARING ORGANOPOLYSILOXANE EMULSION

BACKGROUND OF THE INVENTION

1. Field of the Invention

This invention relates to a process for preparing an emulsion of organopolysiloxane.

2. Description of the Prior Art

Known processes of preparing emulsions of liquid organopolysiloxane include a process of emulsifying liquid organopolysiloxane with use of an emulsifying agent by means of a stirring device that can exert a shearing force at high speed, for example, a homomixer, or ordinary stirring devices.

However, indispensable in the process in which the homomixer is used is that a liquid (the material to be emulsified) is sucked up through a hole provided in a stator and undergoes shearing action. In order for the liquid to be sucked up from the hole, the liquid is required to have at most a viscosity of about 10,000 cP or less. Thus, it has been impossible to emulsify organopolysiloxane of high viscosity, and yet impossible to prepare a good emulsion comprised of fine particles dispersed therein. Although it is possible to emulsify at least a fluid having a viscosity of about several ten thousands when the emulsification is carried out using an ordinary stirring device, the resulting emulsion may only have a particle size of as large as 10 to several tens microns in diameter. Since emulsion products are desired to be comprised of fine particles dispersed therein for the purpose of storage stability of emulsions and stability of dilution processing baths, those obtained by the above process can not be said to have satisfied such demands.

Also known in the present industrial field is a production process according to the so-called emulsion polymerization in which a low molecular cyclic organopolysiloxane used as a starting material is polymerized to a high molecular material with use of a strong acid or strong alkali as a catalyst in an emulsificaytion dispersion system (Japanese Patent Publication No. 13995/1966 and Japanese Patent Publication No. 20116/1969). This process has been widely put into practical use. According to this process, there can be relatively readily prepared even an emulsion of organopolysiloxane having a viscosity of more than 1,000,000 cP of the resulting polymeric product.

However, although the emulsion obtained by the emulsion polymerization can be made to have particle size of dispersed particles as small as about at least 0.2 micron and can have good stability, it involves substantial difficulties such that the emulsifying agents that can be used are limited to anionic or cationic ones and moreover about 10% of the starting organopolysiloxane may remain unpolymerized. The residual low molecular organopolysiloxane thus contained in the emulsion is volatilized when a resulting organopolysiloxane emulsion is used, accompanied by a fear of causing various difficulties such that oxidized white powder is formed by thermal oxidation during a drying step and adhered on the surface of surroundings to cause cissing of coating materials and further cause poor contact in contact points of electrical equipments present in the surroundings.

SUMMARY OF THE INVENTION

Accordingly, an object of this invention is to provide a process of preparing an organopolysiloxane emulsion, that can solve the above problems in the prior arts, can prepare a stable emulsion comprised of fine, dispersed particles by emulsification of an organopolysiloxane of high viscosity, and moreover can use the emulsifying agent regardless of whether it is ionic or nonionic and can prevent inclusion of any volatile low molecular substances.

To achieve the above object, this invention provides a process for preparing organopolysiloxane emulsion comprised of dispersed particles having an average particle size of $0.5\mu$ or less, comprising emulsifying a liquid organopolysiloxane with use of an emulsifying agent by means of a composite emulsifying apparatus equipped with:

(A) a stirring means having a stirring blade capable of stirring contents of a container at a low speed over the whole of the container, and at least one stirring means selected from (B) a disc type stirring means capable of rotating at a high speed and having tooth-like projections on its peripheral edge, and (C) a stirring means having a stator and a turbine blade disposed in the inside of the stator and capable of rotating at a high speed.

Available embodiments of the above stirring device used in the process of this invention include three types comprising the combinations of the stirring means (A) and (B), the means (A) and (C), and the means (A), (B) and (C), respectively, and thus the emulsification is carried out by driving two or three stirring means. Using this composite emulsifying apparatus, organopolysiloxanes ranging from those having a low viscosity of about 1 cP (at 25° C., the same applies in all the occurrence following) to those having a high viscosity of about 500,000 cP can be readily emulsified and yet the resulting emulsion can be a good emulsion having a very high stability, comprised of dispersed particles having an average particle size of $0.5\mu$ or less. Moreover, there can be obtained an emulsion containing no volatile low molecular substances without any limitation in the type of the emulsifying agents to be used.

DETAILED DESCRIPTION OF THE INVENTION

In the composite emulsifying apparatus used in the process of this invention, the stirring means (A) is used for uniformly mixing the liquid organopolysiloxane charged into the container, the emulsifying agent and added water over the whole of the container. There is no limitation in the shape of the stirring blade so long as it can stir the whole of the container and may no obstruct the action of the stirring means (B) and/or (C) used in combination. For example, it may include a stirring means 1 in the apparatus shown in FIG. 1. The composite emulsifying apparatus shown in FIG. 1 employs an anchor-shaped stirring device 1 as the stirring means (A), and is provided with a stirring device 2 as the stirring means (B) and a stirring device 3 as the stirring means (C) so as not to come in touch with the anchor-shaped stirring device.

The stirring means (A) performs the mixing of the liquid material over the whole of the container, and therefore is desired to have gaps as small as possible between the stirring blade and the inner wall surface and bottom surface of the container so as not to cause stagnation of the liquid material even in a local site. Thus, the blade may preferably have a diameter of at least 90% or more of the inner diameter of the container, and there can be obtained a great effect if a scraper made of resin is fitted to the peripheral edge of the blade. The anchor-shaped stirring device 1 in FIG. 1 embodies a preferred example of the stirring means (A).

The stirring means (A), unlike the other two stirring means (B) and (C), may not be required to effect stirring at a high speed, and, for example, several rpm to about 100 rpm may suffice for its rotational speed.

According to the process of this invention, it is usually possible to emulsify an organopolysiloxane having a high viscosity of about 500,000 cP. However, since the upper limit of possible viscosity depends on the ability of the stirring means (A), it is also possible to emulsify even an organopolysiloxane having a higher viscosity depending on the selection of the stirring means (A) and the increase of the power output.

Figure 1:
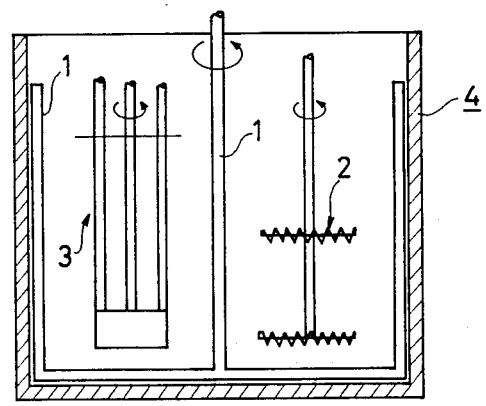
FIG. 1 illustrates an example of the composite emulsifying apparatus used in the process of this invention.
Figure 3:
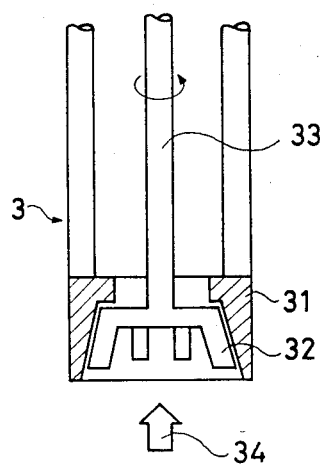
FIGS. 2, and 2B and FIG. 3 respectively illustrate examples of the disc type stirring means, and the high speed stirring means comprising a stator and a turbine blade.
Figure 2A:
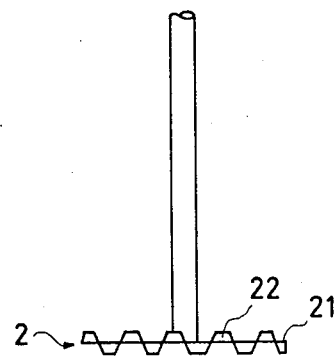
Figure 2B:
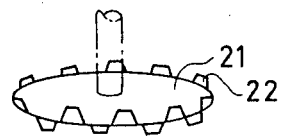

The disc type stirring means (B) rotaes at a high speed and is used for stirring and finely crushing at a high speed a mixture of an organopolysiloxane of high viscosity, an emulsifying agent and added water. There is used a device comprising a rotatable disc provided on its peripheral edge with small tooth-like projections inclined or upright to the plane of the disc, for the purpose of increasing the efficiency of the shearing and crushing action of the device. A stirring device 2 shown in FIG. 1 is an example in which two sets of such a disc type stirring means are equipped, and FIG. 2A is a plane view showing the disc type stirring means and FIG. 2B is a perspective view thereof. In this embodiment, tooth-like projections 22 are alternately upward and downward provided on the peripheral edge of a disc 21. In this stirring device 2, considering the efficiency of stirring or the strength of shear dispersion against the liquid mixture, the rotational speed is required to be able to be increased to a rotational speed of from 1,000 to 2,000 rpm. Accordingly, in order to accommodate itself to the situation, it is desirable to use a device of a rotational speed variable type. An emulsion suffering no emulsification irregularity and comprised of uniform and fine dispersed particles can be obtained by the combination with the stirring means (A) used for mixing and uniformly dispersing the whole of the liquid material. The stirring means (C) comprises a turbine blade rotating at a high speed in a stator, capable of acting itself as a pump, so that the liquid material sucked up into the stator undergoes a strong shear force between the stator and the turbine blade and can be finely dispersed. FIG. 3 is an enlarged view, partially sectional, of the stirring device 3 in FIG. 1 corresponding to the stirring means (C). A turbine blade 32 provided inside the stator 31 rotates at a high speed on a shaft 33 serving as a rotational axis. The liquid material is sucked up as shown by an arrow 34, into the stator 31 from a hole at the bottom portion, and ground down and dispersed by the strong shearing force at the time it passes through a narrow gap between the stator 31 and the turbine blade 32. This stirring means (C) can rotate at a high speed of 10,000 to 20,000 rpm.

For this stirring means (C) it is difficult to suck up the liquid material into the inside thereof if it has a viscosity of about 10,000 cP. Accordingly, this stirring means is suited for thickening a liquid composition of a viscosity of about 10,000 or less by effecting phase inversion thereof to an o/w emulsion. The emulsion thus thickened can be led to a good emulsion having still finer dispersed particles by use of the stirring means (A) and (B) in combination, by virtue of strong shear dispersion.

Accordingly, the combination of stirring means (A) and (B) or (A), (B) and (C) is suited for emulsifying an organopolysiloxane having a high viscosity more than about 10,000 cP. For emulsifying an organopolysiloxane having a relatively lower viscosity, the combination of stirring means (A) and (C) or (A), (B) and (C) is desirable as such or organopolysiloxane is required to be thickened by effecting the phase inversion with the o/w emulsion with use of the stirring means (C).

There is no particular limitation in the liquid organopolysiloxane used in the process of this invention, and it may include, for example, dialkylpolysiloxanes, alkylarylorganopolysiloxanes, and modified organopolysiloxanes in which any of these are modified with an aminoalkyl group, an epoxy group or carboxylic acid, which may be of straight chain or branched chain structure. Examples of such organopolysiloxanes may include those having the following structure.

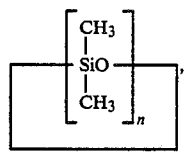

(wherein n is an integer of 3 or more)

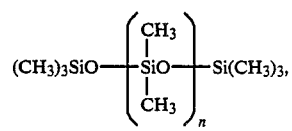

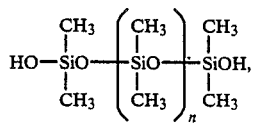

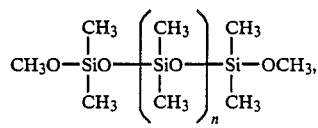

-continued

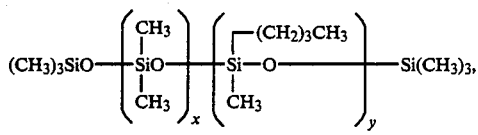 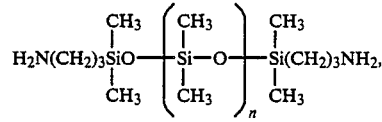

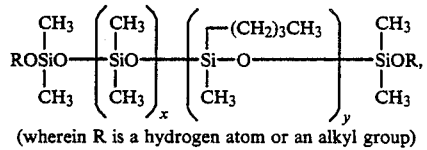
(wherein R is a hydrogen atom or an alkyl group)

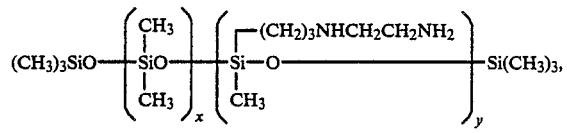

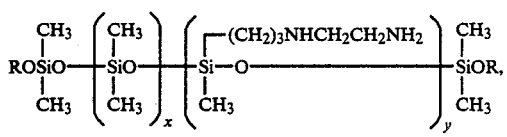
(wherein R is a hydrogen atom or an alkyl group)

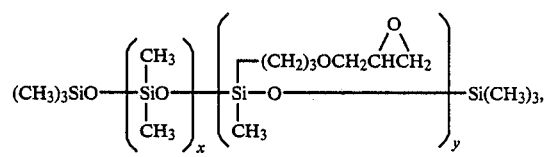

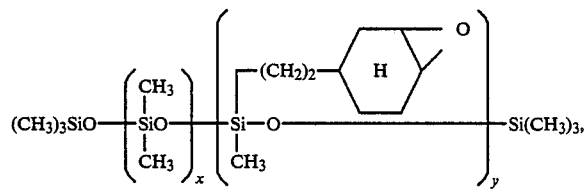

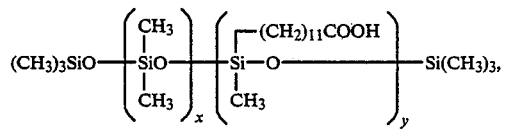

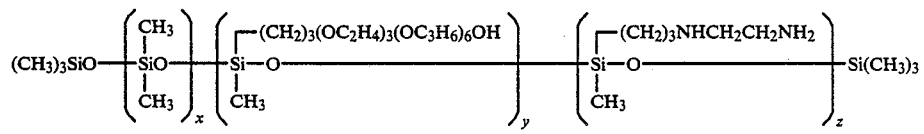

These organopolysiloxanes may be used alone or in combination of two or more ones depending on the purpose.

Referring next to the emulsifying agent used in the process of this invention, it may include common nonionic surface active agents, anionic surface active agents, cationic surface active agents and amphoteric surface active agents, and there can be used various ones conventionally known. As compared with the fact that in the preparation of emulsions by effecting emulsification dispersion of organopolysiloxanes having a high viscosity, it has been necessary to carry out the emulsion polymerization using the combination of an anionic surface active agent with a strong acid catalyst or the combination of a cationic surface active agent with a strong alkali catalyst, it is a great advantage that the limitation in the surface active agent when used can be removed.

Examples of the surface active agents to be used may include nonionic surface active agents such as polyoxyethylene alkyl ethers, polyoxyethylene alkyl phenyl ethers and sorbitan aliphatic acid esters; anionic surface active agents such as long chain alkylsulfates, alkylsulfonates, sodium sulfate of polyoxyethylene alkyl phenyl ethers and ammonium sulfate of polyoxyethylene alkyl phenyl ethers; cationic surface active agents such as alkyltrimethyl ammonium chlorides and benzyl ammonium salts; and amphoteric surface active agents of alkyl betaine types, which can be used alone or in combination of plural ones.

As for the amount of emulsifying agent to be used, the emulsifying agent may be mixed in an amount of 1 part to 300 parts by weight based on 100 parts by weight of the liquid organopolysiloxane to be used. Desirably, it is used in an amount of 2 part to 30 parts by weight.

The preparation of the organopolysiloxane emulsion according to the process of this invention can be carried out usually by charging the organopolysiloxane and the emulsifying agent among the stirring devices, adding a small amount of water in the state they have been uniformly mixed by use of the stirring means (A), and next carrying out the phase inversion to the o/w type emulsion by use of the stirring means (A) and either one or both of the stirring means (B) and (C) to make the emulsion sufficiently uniformly dispersed, followed by addition of water to dilute it to have a given concentration.

The water added for the purpose of the phase inversion may be used usually in an amount of about 1 part to 50 parts by weight based on the liquid organopolysiloxane, but may be used in an amount necessary for the phase inversion without any particular limitation.

The organopolysiloxane emulsion obtained by the process of this invention can have dispersed particles as fine as $0.5\mu$ or less in average particle size, also with a narrow particle size distribution, and have a high stability. Therefore, it can be utilized in all the known uses by appropriately selecting the organopolysiloxane and emulsifying agent to be used. Such known uses may include, for example, emulsion type release agents, lubricants for fibers, softeners for fibers (in particular, highly viscous amino-modified siloxanes, highly viscous epoxy modified siloxanes, highly viscous carboxylic acid modified siloxanes, etc.), organic or inorganic surface treatment materials, starting materials for emulsion type silicone antifoamers, etc., and the present emulsion can be used by mixing additives including colored matters such as pigments and dyes, hydrogen dispersions of inorganic or organic fillers, bulking agents, antistatic agents, etc. It is also possible to prepare a curable emulsion composition by adding in an emulsion obtained by emulsifying every sort of reactive organopolysiloxane, a cross-linking agent, a catalytic substance, etc. as an aqueous dispersion or in a water-soluble state.

This inventon will be described below more specifically with reference to Examples, but is by no means limited to these.

EXAMPLE 1

In a composite emulsifying apparatus made of stainless steel and equipped with two types of stirring devices comprising an anchor-shaped stirring device 1 (maximum diameter: 49 cm) having the shape as shown in FIG. 1 and capable of stirring the whole of the inside of a 50 lit. volume stainless steel container (inner diameter: 50 cm) and a high speed stirring device 2 having a disc type stirring means (diameter: 10 cm) as shown in FIG. 2, provided on its peripheral edge with small tooth-like projections in an alternately upward and downward fashion, 15 kg of dimethylpolysiloxane terminated with trimethyl groups and havng a viscosity of 200,000 cP at 25° C. and 0.50 kg of poly(oxyethylene)$_{10}$nonyl phenyl ether were charged, and the contents were stirred for 15 minutes at 30 rpm using the above anchor-shaped stirring device 1 until they were uniformly dispersed. Thereafter, the disc type high speed stirring device 2 was driving at 1,500 rpm and 0.30 kg of water was added for the purpose of phase inversion to carry out stirring for 30 minutes using both the stirring devices 1 and 2 to obtain a transparent greasy product. After the stirring device 2 was stopped, 36.7 kg of water was added, and the contents were uniformly dispersed by use of the stirring device 1 to obtain a nonionic type emulsion having 40% silicone concentration.

The resulting emulsion was comprised of dispersed particles having an average particle size of $0.42\mu$, and was found to be stable as being free from any separation even when it was allowed to stand for 3 months at 70° C.

EXAMPLES 2 TO 4

Example 1 was repeated to prepare emulsions, except that the kind and charge weight of base fluids, the kind and charge weight of emulsifying agents and the amount of water added for dilution were varied as shown in Table 1.

Appearance and average particle size of the dispersed particles in the resulting emulsions are also shown in Table 1.

The emulsions obtained in Examples 2 to 4 did not cause any separation even when they were allowed to stand for 3 months at 70° C., and thus found to be stable.

TABLE 1

| Example | 2 | 3 | 4 |
|---|---|---|---|
| Base fluid | Amino modified methylpolysiloxane | Epoxy modified methylpolysiloxane | Carboxylic acid modified methylpolysiloxane |
| Modification group | $-(CH_2)_3NHCH_2CH_2NH_2$ | $-(CH_2)_3OCHCH\overset{O}{\overset{/\backslash}{-}}CH_2$ | $-(CH_2)_{11}COOH$ |
| Fluid viscosity (cP) | 75,000 | 35,000 | 50,000 |
| Modification equivalent | 5000 | 4000 | 5000 |
| Charge weight (kg) | 12 | 12 | 12 |
| Amount of poly-(oxyethylene)$_{10}$octyl phenyl ether (kg) | 1.8 | 1.2 | 1.2 |
| Amount of water added (kg) | 26.2 | 26.8 | 26.8 |
| Appearance of emulsion | White | White | White |
| Average particle size of dispersed particles ($\mu$) | 0.35 | 0.23 | 0.40 |

EXAMPLE 5

Example 1 was repeated to prepare an emulsion, except that conditions for the base fluid, emulsifying agent and water were varied as shown below.
Base fluid:
Hydroxyl-terminated dimethyl polysiloxane of 300,000 cP: 15 kg
Emulsifying agent:

Poly(oxyethylene)$_{15}$octyl phenyl ether: 0.75 kg
Poly(oxyethylene)$_{10}$octyl phenyl ether: 0.75 kg
Water:
City water: 21.0 kg

EXAMPLE 6

An emulsion was prepared under the following conditions by using as an emulsifying apparatus the same apparatus as in Example 1 except that the high speed stirring device 3 as shown in FIG. 3, having a stator and a turbine blade provided inside the stator, was equipped in addition to the stirring device 1 and 2.

Octamethylcyclotetrasiloxane: 12 kg
Sodium laurylsulfate: 0.40 kg
Poly(oxyethylene)$_{10}$octyl phenyl ether: 0.40 kg
City water: 26.8 kg More specifically, octamethylcyclotetrasiloxane and poly(oxyethylene)$_{10}$octyl phenyl ether were uniformly dispersed with use of the stirring devices 1 and 3, followed by addition of a 50% aqueous solution of sodium laurylsulfate, and the mixture was stirred for 5 minutes at 30 rpm in respect of the stirring device 1 and at 7,000 rpm in respect of the stirring device 3. Water was slowly added thereafter. At the time the viscosity in the system increased, stirring was carried out for 30 minutes by driving the stirring device 2 at 1,500 rpm. Thereafter, the stirring devices 2 and 3 were stopped, and while driving only the stirring device 1, the remaining water was added for dilution to give a 30% white emulsion.

The resulting emulsion was comprised of dispersed particles having an average particle size of 0.4μ, showing good stability.

EXAMPLE 7

Using the composite emulsifying apparatus used in Example 1, 15 kg of amino modified methylpolysiloxane modified with +CH$_2$)$_3$NH$_2$ groups, having a viscosity of 120,000 cP and an amine equivalent of 8,500, 1.0 kg of a cationic emulsifying agent of the formula:

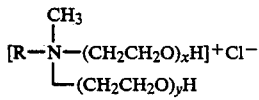

wherein R is an oleyl group and $x+y=z$, and 0.5 kg of poly(oxyethylene($_{10}$octyl phenyl ether were charged therein, and the materials were stirred by driving the stirring device 1 at 30 rpm and the stirring device 2 at 1,800 rpm. After addition of 2.0 kg of city water, stirring was continued for 30 minutes to obtain a transparent stiff and greasy inverted base.

Next, while continuing the stirring by driving the stirring device 1 at 30 rpm and the stirring device 2 at 50 rpm, 19.0 kg of water was added to give a 40% white emulsion. The resulting emulsion had an average particle size of 0.35μ. It showed no change such as separation even after it was allowed to stand for 3 weeks at 50° C., and found to be stable.

COMPARATIVE EXAMPLE 1

A composition comprising the same materials in the same composition as used in preparing the emulsion in Example 1 was tried being emulsified with use of a commercially available homomixer (produced by Tokushu Kika K.K.) of a scale 1/50 smaller than the apparatus used in Example 1. However, the highly viscous dimethylpolysiloxyane could not be stirred and no emulsification was achieved.

We claim:

1. A process for preparing an organopolysiloxane emulsion, comprising emulsifying a mixture containing (i) a liquid organopolysiloxane, (ii) at least one emulsifying agent selected from the group consisting of nonionic surface active agents, anionic surface active agents, cationic surface active agents and amphoteric surface active agents, and (iii) water; wherein emulsification is effected by means of a composite emulsifying apparatus equipped with (A) a stirring means having a stirring blade capable of stirring said mixture, in a container, at a low speed of 100 rpm or less, over the whole of the container, whereby the contents are uniformly mixed and dispersed and local stagnation is prevented, and at least one additional stirring means selected from the group consisting of (B) a disc type stirring means capable of rotating at a high speed of 1,000 to 2,000 rpm, and having tooth-like projections on its peripheral edge, whereby the mixture is sheared and finely crushed, and (C) a stirring means having a stator and a turbine blade disposed in the inside of the stator and capable of rotating at a high speed of 10,000 to 20,000 rpm, whereby the mixture is strongly sheared and finely dispersed, wherein the dispersed particles in the resultant emulsion have an average particle size of 0.5 micron or less.

2. The process of claim 1, wherein said organopolysiloxane is at least one member selected from the group consisting of straight chain and branched chain dialkylpolysiloxanes and alkylarylorganopolysiloxanes, unmodified or modified with aminoalkyl, epoxy or carboxylic acid groups.

3. The process of claim 1, wherein said emulsifying agent is used in an amount of from 1 to 300 parts by weight, based on 100 parts by weight of said liquid organopolysiloxane.

4. The process of claim 3, wherein the amount of said emulsifying agent is from 2 to 30 parts by weight.

5. The process of claim 1, wherein the emulsification is effected by first uniformly mixing said liquid organopolysiloxane, said emulsifying agent and a small amount of water to form a w/o emulsion, using said stirring means (A), and then adding at least sufficient water for effecting phase inversion and effecting such phase inversion to an o/w emulsion, using said stirring means (A) and either or both of said stirring means (B) or (C).

6. The process of claim 5, wherein the amount of water added for said phase inversion is from about 1 to about 50 parts by weight, based on the weight of said liquid organopolysiloxane.

7. The process of claim 1, wherein said composite emulsifying apparatus comprises said stirring means (A) and (B).

8. The process of claim 1, wherein said composite emulsifying apparatus comprises said stirring means (A) and (C).

9. The process of claim 1, wherein said composite emulsifying apparatus comprises said stirring means (A), (B) and (C).

10. The process of claim 1, wherein said stirring means (A) is an anchor-shaped stirring device.

11. The process of claim 1, wherein said stirring means (A) comprises a stirring blade having a diameter of at least 90% of the diameter of the container.

12. The process of claim 1, wherein said stirring means (A) comprises a stirring blade having a scraper fitted on the peripheral edge thereof.

13. The process of claim 1, wherein said stirring means (B) is a disc type stirring device comprising a disc fitted to a rotary axis and provided on its peripheral edge with small tooth-like projections inclined or upright to the disc.

14. The process of claim 1, wherein said organopolysiloxane has a viscosity in the range of 1 to 500,000 cP.

* * * * *